United States Patent [19]
Seigneur et al.

[11] Patent Number: 5,608,937
[45] Date of Patent: Mar. 11, 1997

[54] PORTABLE RAMP

[75] Inventors: Robert L. Seigneur, Pioneer; Richard W. Frankel, Hudson, both of Ohio

[73] Assignee: Universal Industrial Products Company, Pioneer, Ohio

[21] Appl. No.: 147,862

[22] Filed: Nov. 4, 1993

[51] Int. Cl.⁶ .................................................. E01D 1/00
[52] U.S. Cl. .............................. 14/69.5; 14/71.1; 404/21; 414/537; 238/10 R
[58] Field of Search ..................................... 14/69.5, 71.5, 14/72, 71.1; 414/537; 24/457, 458; 238/10 R; 296/61; 182/108; 248/188.9; 52/177, 180; 404/19, 21

[56] References Cited

U.S. PATENT DOCUMENTS

| | | |
|---|---|---|
| 1,568,303 | 1/1926 | Webster . |
| 2,278,554 | 4/1942 | Morton ..................... 404/21 |
| 2,594,425 | 4/1952 | Greenberg . |
| 2,992,696 | 7/1961 | Jedinak .................... 182/108 |
| 3,487,489 | 1/1970 | Kuhns ...................... 14/69.5 |
| 3,962,747 | 6/1976 | Soffage .................... 14/69.5 |
| 3,984,891 | 10/1976 | Weinmann ................. 14/69.5 |
| 4,528,711 | 7/1985 | Packer ..................... 14/69.5 |
| 4,727,612 | 3/1988 | Smith ...................... 14/69.5 |
| 4,833,999 | 5/1989 | Rhoades ................... 108/38 |
| 4,853,999 | 8/1989 | Smith ...................... 14/69.5 |

Primary Examiner—Henry A. Bennett
Assistant Examiner—Pamela A. O'Connor
Attorney, Agent, or Firm—Harness, Dickey & Pierce, P.L.C.

[57] ABSTRACT

A portable ramp for providing a bridge between a ground level surface and a raised surface. The ramp includes a support plate having a substantially horizontal first portion adapted to rest along an edge of the raised surface. A second portion of the plate extends vertically downward from the first portion and a third portion extends generally outwardly from the second portion in a direction generally toward the ground level surface. The third portion of the plate member supports one end of an angled beam which extends at a generally predetermined angle from the plate to the ground level surface. The opposite end of the beam is supported with respect to the ground level surface by a resilient foot member which provides stability. A traction plate having upwardly projecting portions is attached to a top surface of the beam intermediate the support plate and foot member in order to increase friction and provide traction along the inclined beam.

24 Claims, 4 Drawing Sheets

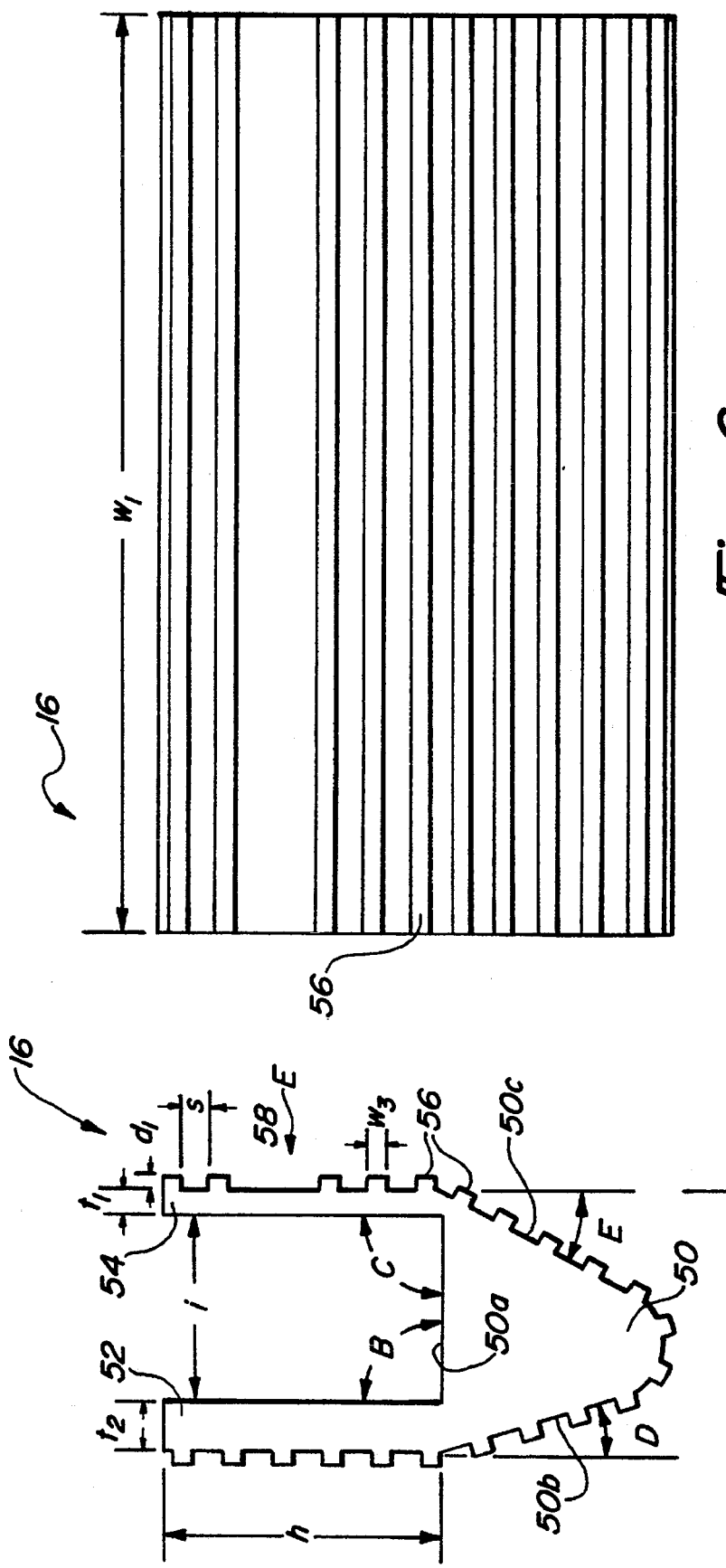

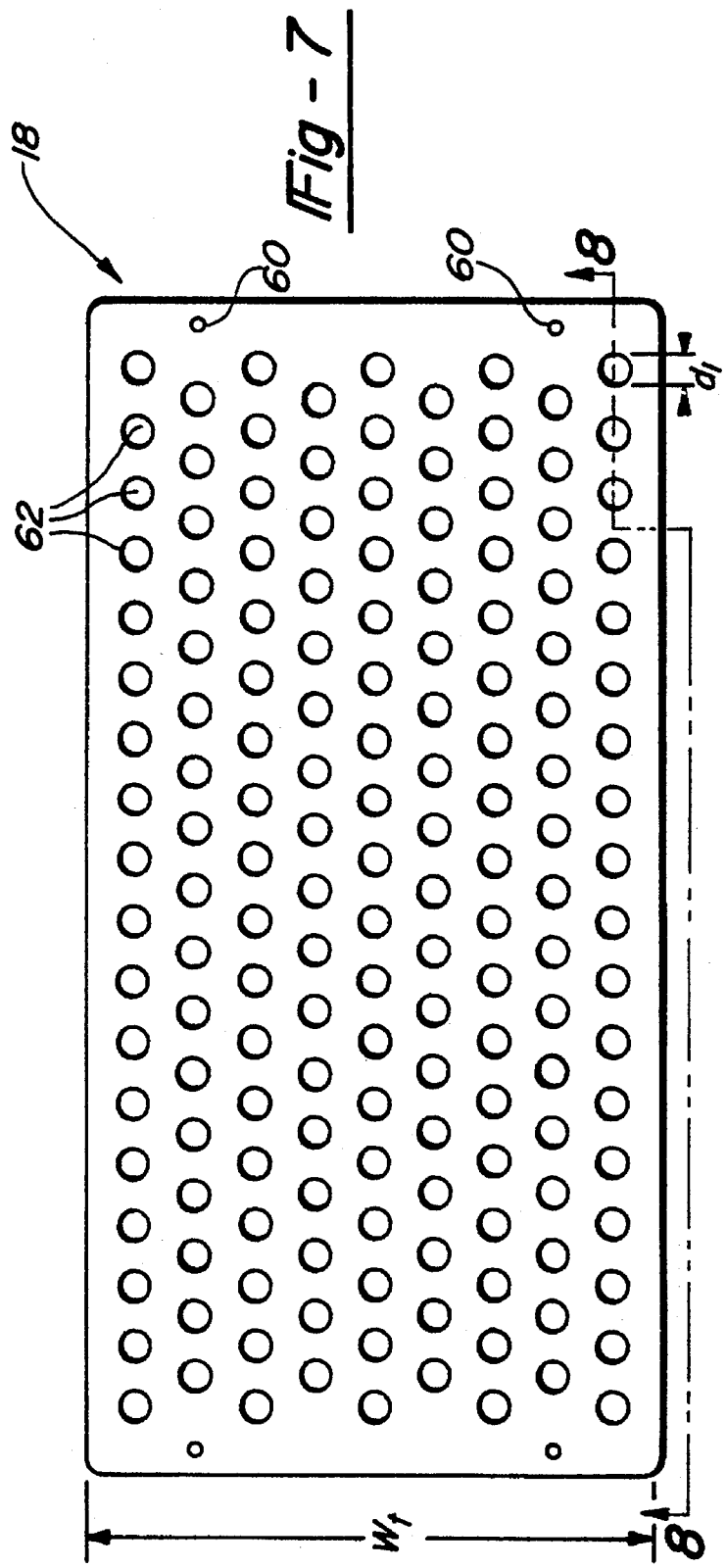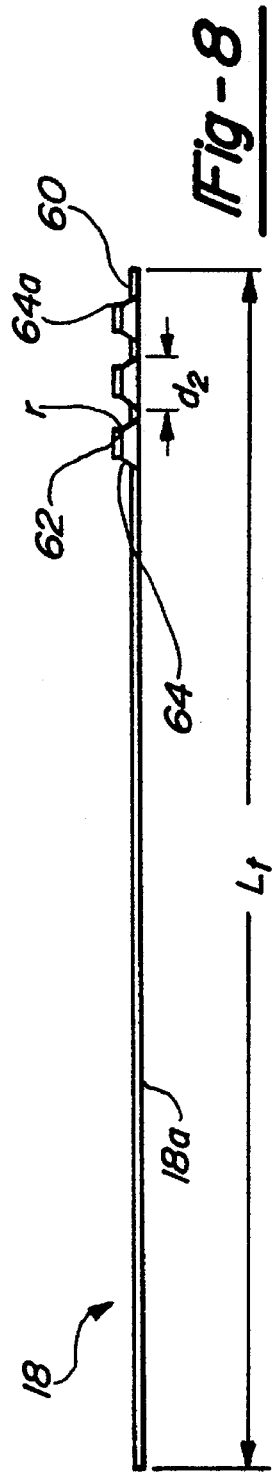

PORTABLE RAMP

BACKGROUND OF THE INVENTION

This invention relates generally to a portable ramp for providing a bridge between surfaces at different elevations such as a ground level surface and a raised surface.

Oftentimes it is necessary to move a relatively heavy article from a lower or ground level surface onto a raised surface substantially above ground level. These articles may have wheels, or be otherwise carried on a cart or dolly with wheels, or may be hand carried. Examples include moving a motorcycle, garden tractor or other vehicle onto the bed of a pickup truck or flatbed trailer, loading furniture or other items into a moving van, or even bridging a set of stairs to facilitate handicapped access. In order to most conveniently accomplish such tasks, it is usually advantageous to provide an angled ramp between the ground level and raised surfaces in order to eliminate one or more large or otherwise inconvenient steps.

Portable or non-permanent ramp means typically employed for such purposes include one piece metal ramps or multi-piece skids of various types. Examples of one type of portable multi-piece ramp structure are illustrated in U.S. Pat. No. 4,727,612, issued Mar. 1, 1988, and related U.S. Pat. No. 4,853,999, issued Aug. 8, 1989. This type of ramp generally includes a beam of lumber supported in an inclined position between a foot member, which typically rests on the ground, and a plate structure, which is used to support the ramp on a raised surface such as the tail end of a motor vehicle. The foot and plate structure are each formed of metallic plates removably secured to opposite ends of the beam. The present invention is directed to a substantial improvement over ramp structures of this type.

SUMMARY OF THE INVENTION

Thus, the present invention provides an improved ramp of this general type which is portable and fairly lightweight but also sturdy. It is also adaptable to be manufactured as a set of easily assembled components for sale, storage and/or transport in a compact kit form.

The invention includes three components from which a ramp can be constructed for bridging a lower or ground level surface to a raised surface. The first component is a support plate, essentially a rectangular sheet formed so as to have a substantially horizontal first portion which is adapted to rest along an edge of the raised surface, a second portion extending vertically downwardly from the first portion and a third portion which extends outwardly therefrom in a direction generally toward the ground level surface. The third portion of the support plate is adapted to be secured to and support thereupon one end of a beam which, when in use, is inclined at a generally predetermined ramp angle between the plate and ground level surface.

The second component of the present ramp is a foot member, made of a generally resilient material and removably attached to the opposite or ground end of the beam. The foot member provides stable support for the ramp with respect to the ground level surface and is constructed to resist slippage of the ramp along the ground level surface, especially when weight is placed on the angled beam.

The foot member has a generally uniform cross sectional shape and includes one substantially solid portion which is generally triangular in cross section, adjacent a pair of parallelly spaced upstanding members. The beam is positioned with respect to the foot so that the end of the beam is located between the upstanding members and abuts one side or the base of the solid triangular portion. Another side of the solid triangular portion of the foot member supports the ramp at the ground level surface.

The third component of the present ramp is a traction plate which is mounted to the beam in order to improve traction along the upper surface of the angled beam. The traction plate is formed separately and one or more of these plates may be securely attached to the beam intermediate the support plate and foot member. The traction plate includes a series of upwardly projecting portions which frictionally engage a tire and/or a person's shoes along the inclined beam surface in order to provide traction and resist slippage with respect to the beam.

Additional objects, advantages, and features of the present invention will become apparent from the following description and appended claims, taken in conjunction with the accompanying drawings.

BRIEF DESCRIPTION OF THE DRAWINGS

FIG. 5 is a side view illustrating the foot member.

FIG. 6 is a plan view of the foot member, taken generally in the direction E shown in FIG. 5.

FIG. 7 is a plan view of the traction plate.

FIG. 8 is a side view of the traction plate, in partial cross section, taken generally through line 8—8 of FIG. 7.

DETAILED DESCRIPTION OF A PREFERRED EMBODIMENT

Figure 1:
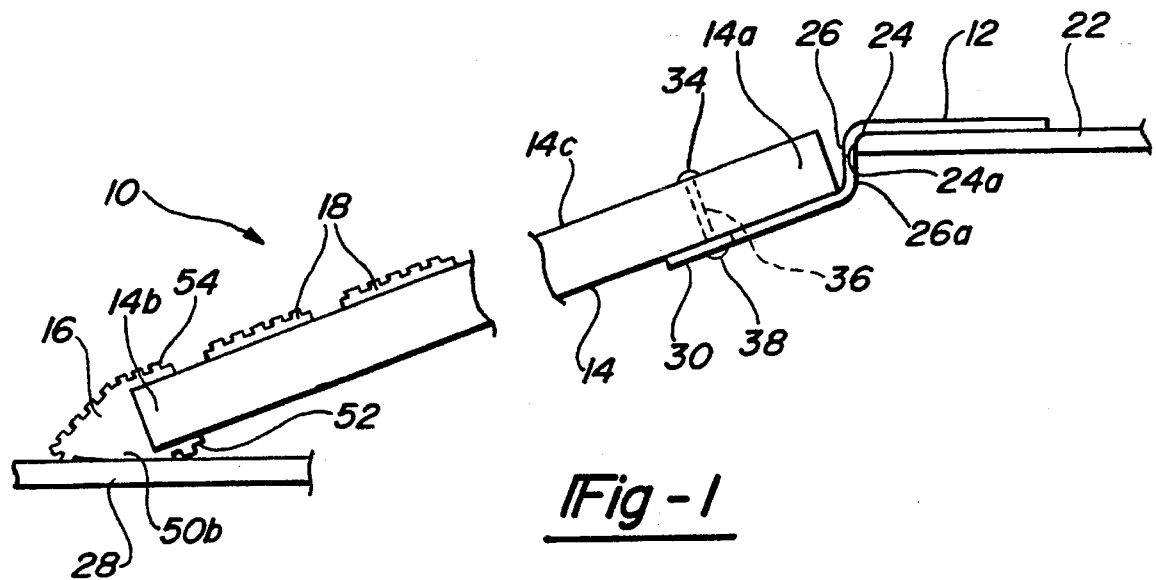
FIG. 1 is a side view of a portable ramp according to the teachings of the present invention.

Referring now to the drawings, a portable ramp according to the teachings of the present invention is indicated generally at 10 in FIG. 1. Ramp includes a support plate 12, an angled or inclined beam 14 and a foot member 16. Ramp 10 also includes one or more traction plates 18 adapted to increase friction along a top surface of angled beam 14. A single ramp 10 may be used in a particular application or alternately one or more ramps could be used in combination.

Figure 2:
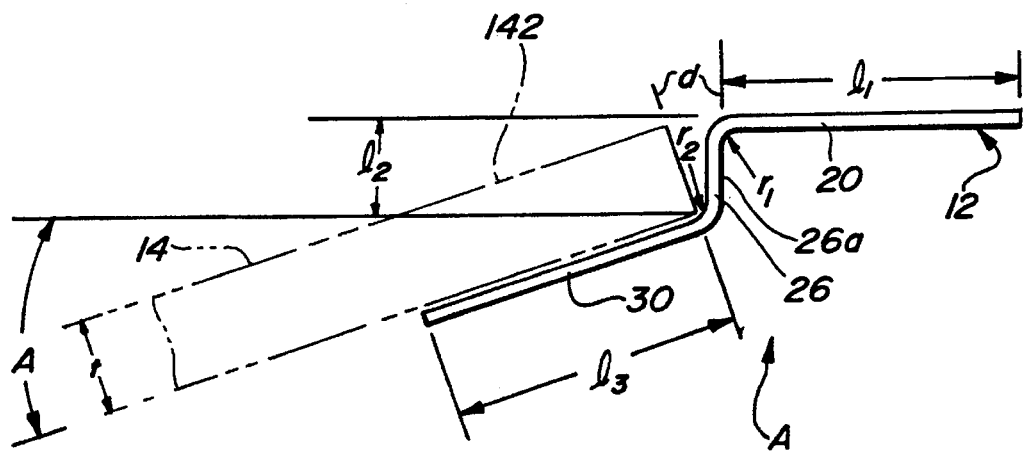
FIG. 2 is a side view of the support plate of the present ramp.
Figure 3:
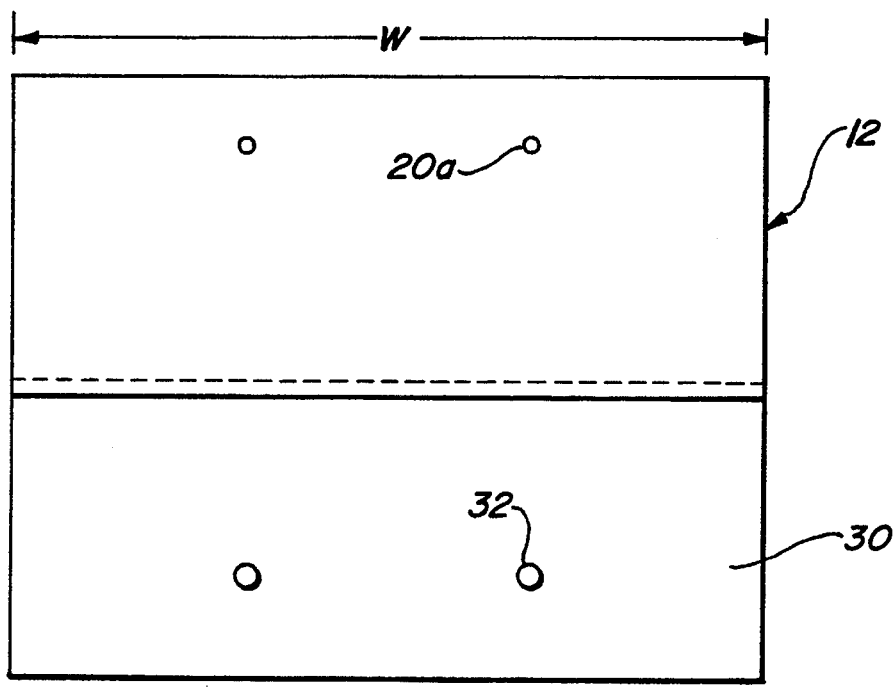
FIG. 3 is a plan view of the support plate.

FIGS. 2 and 3 illustrate the support plate 12 of ramp 10 in greater detail. As shown therein, support plate 12 is preferably a generally rectangular plate made of any suitable strong and rigid material, such as steel, which has been formed into three main portions, preferably by bending about a pair of substantially parallel axes. As will be seen, the plate 12 is of a generally simple construction and in a preferred form of the invention is stamped from heavy sheet steel.

A first portion 20 of support plate 12 is substantially flat and is adapted to be disposed in a generally horizontal position when ramp 10 is in use. Portion 20 is preferably configured so as to rest upon raised surface 22 and is of a length $l_1$ which is adequate to provide stable support of the ramp 10 upon raised surface 22. In a preferred embodiment, length $l_1$ is approximately 3 to 5 inches.

Figure 4:
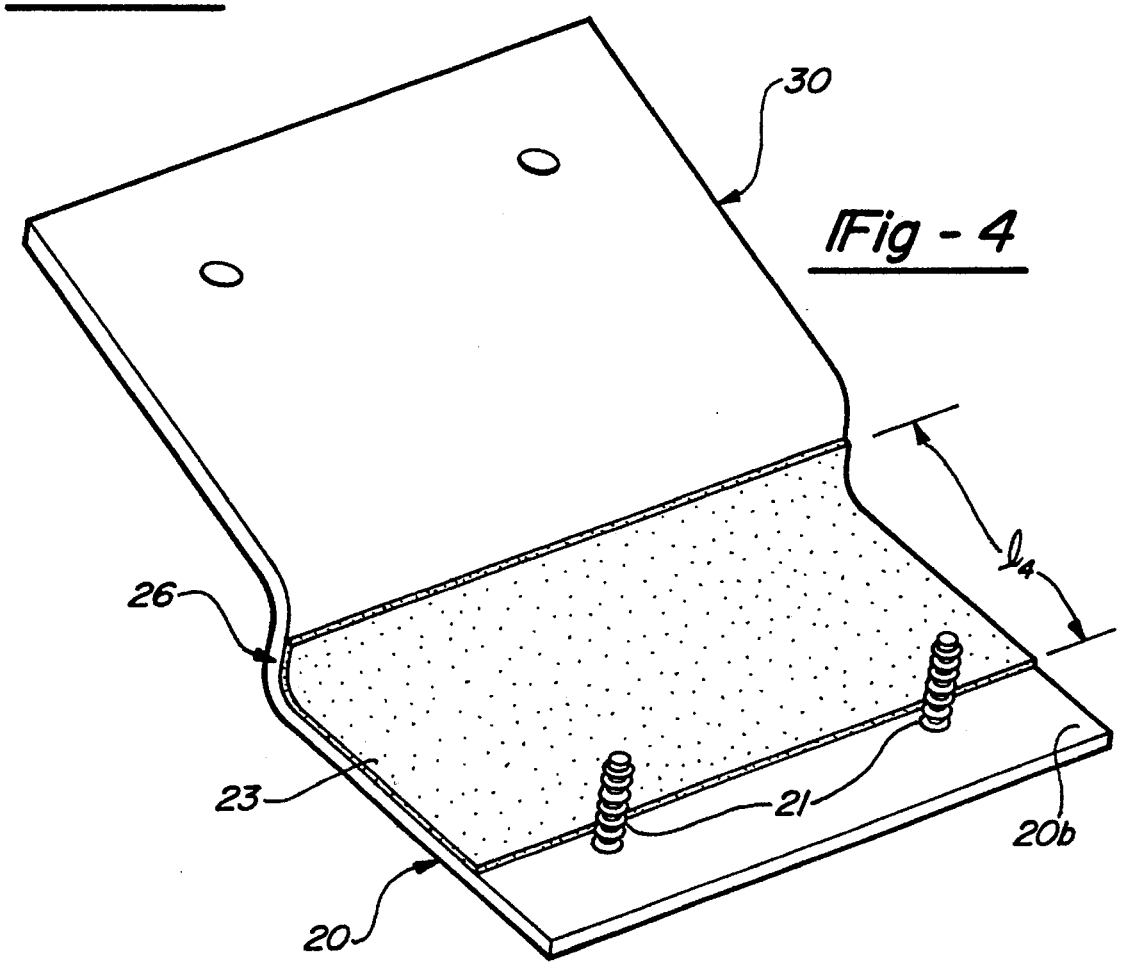
FIG. 4 is a plan view of the support plate, taken generally from direction A in FIG. 2.

First portion 20 of plate 12 also includes one or more pierced holes 20a through which a nail or threaded fastener such as a self tapping screw 21 is to be placed in order to fixedly secure first portion 20 to raised surface 22. Holes 20a may also be countersunk if desired, in order to avoid a projecting fastener head. Other suitable means of further securing first portion 20 to raised surface 22 could also be used. As shown in FIG. 4, first portion 20 preferably also has disposed upon a bottom surface 20b thereof, a resilient pad or mat 23 adapted to increase friction between plate 12 and surface 22 as well as to increase stability. In addition, the pad 23 also acts to inhibit scratching or otherwise marring the raised surface 22. Mat 23 is preferably made of open cell neoprene rubber about 0.0625 inches thick and extends along the width w of support plate 12 a length $l_4$ of approximately 3.625 inches.

Extending from first portion 20, beyond an edge 24 of raised surface 22, is a second portion 26 of support plate 12. Second portion 26 extends substantially downwardly from first portion 20, preferably at an approximately 90° angle. First portion 20 may be disposed with respect to upper surface 22 so that surface 26a of second portion 26 abuts and bears against a surface 24a of edge 24 in order to provide additional support thereagainst. In a preferred embodiment wherein plate 12 is formed of sheet metal about 0.187 to 0.25 inches thick, the bend radius r1 between first and second portions 20 and 26, is preferably about 0.25 inches. As shown in FIG. 4, a portion of mat 23 also preferably extends from first portion 20 of support plate 12 at least halfway up second portion 26.

Extending outwardly from second portion 26, away from raised surface 22 and toward ground level surface 28, is a third portion 30 of support plate 12. As shown in FIG. 2, third portion 30 preferably extends at a generally predetermined angle A of approximately 18° from the plane extending from first portion 20 or from horizontal, this angle of incline found generally to be suitable for most applications. Third portion 30 is of a length $l_3$ which in this exemplary embodiment is about 3 to 5 inches.

Third portion 30 is preferably adapted to support one end 14a of angled beam 14 thereupon. Beam 14 is preferably rigid, substantially flat and equal in width or generally no greater than the width w of plate 12. Beam 14 may be a sturdy piece of lumber, preferably thick enough to be strong and wider than six inches, such as a standardly available two-by-eight or two-by-twelve board. Beam 14 could alternately be formed of any other suitable material such as a metal or hard plastic. When used with a two-by-eight piece of lumber, the width w of plate 12 is preferably around 7.25 inches, or about 11.25 inches when beam 14 is a two-by-twelve.

Third portion 30 of support plate 12 preferably includes at least one hole 32 through which a bolt 34 may pass. Bolt 34 preferably also passes through a suitably fashioned corresponding hole 36 in beam 14 and may be held securely therein by a suitable retaining means such as a washer and nut 38. Alternately, however, any other suitable fastening means for securely mounting beam 14 onto support plate 12 may also be employed.

Support plate 12 is preferably configured so as to support beam 14 in a position like that illustrated in FIG. 2 wherein the distance from an inside bend radius r2 of plate 12 to a top surface of first portion 20 is substantially equal to the thickness t of beam 14. This configuration minimizes any discontinuity d between an upper surface of beam 14 and first portion 20 of plate 12. In a preferred embodiment wherein beam 14 is a standard board such as a two-by-eight or two-by-twelve, this distance 12 is preferably approximately 1.5 inches.

As shown in FIG. 1, end 14b of beam 14, the end opposite that secured to third portion 30 of plate 12, is supported along ground level surface 22 by a foot member 16. Foot member 16, in the exemplary embodiment illustrated in FIGS. 5 and 6, is of a substantially uniform cross section and includes three main portions. A solid portion 50 of foot member 16 is preferably of a generally triangular cross sectional shape. A pair of upstanding support members 52, 54 extend parallelly, substantially perpendicularly away from a flat side 50a or base of triangular portion 50, and are adapted to retain and support beam 14 therebetween. Lower member 52 preferably has a body thickness $t_2$ which is thicker than body thickness $t_4$ of upper member 54, thickness $t_2$ being approximately 0.37 inches and thickness $t_4$ approximately 0.19 inches.

In a preferred embodiment, with beam 14 being a substantially flat board, the space created between triangular portion 50 and upstanding members 52, 54 is generally rectangular. The angles B and C of foot member 16 are therefore preferably substantially right angles and end 14b of beam 14 is positioned so as to abut surface 50a of triangular portion 50. Alternately, however, additional means such as nails, threaded fasteners, epoxy or any other suitable means could also be used to further secure beam 14 within foot member 16.

The angle D of triangular portion 50 of foot member 16, as shown in FIG. 5, preferably is less than around 20° and corresponds closely or is equal to angle A of third portion 30 of support plate 12. As shown in FIG. 1, side 50b of foot member 16 is adapted to rest upon the ground level surface 22 while beam 14 is supported between members 52 and 54 and by side 50a of triangular portion 50. Side 50c may be at any suitable angle E with respect to member 54, this angle preferably being between about 28° to 30°.

Foot 16 is preferably made of a rubber or other suitable resilient, elastomeric material, or depending upon the application may alternately be made of a less resilient material such as a metal. In one form of the invention foot 16 is made of a rubber material being Black EPDM having a durometer of around 70 Shore A. In addition, foot 16 provides a cushioning effect with the ground surface 28. Foot member 16 preferably includes a plurality of protrusions or ribs 56 adapted to increase friction with ground level surface 28. Ribs 56 on remaining side 50b of triangular portion 50 and on upstanding members 52 and 54 also increase traction. Alternately, however, various other means to increase friction and to provide lateral support to ramp 10 could also be provided on foot 16.

In the preferred embodiment of foot 16 illustrated in FIGS. 5 and 6, protrusions 56 are substantially rectangular in cross section, extend along the entire width of foot 16 and are integrally formed with foot 16. Ribs 56 preferably have a depth d of approximately 0.1 inches, a width $w_3$ of approximately 0.15 inches and are generally spaced apart a distance s of about 0.25 inches. As shown in the plan view of FIG. 6, one or more larger spaces 58 between protrusions 56, measuring preferably around 0.66 inches, may also be provided in order to allow space for further fastening foot 16 to beam 14, such as with nails or threaded fasteners placed therethrough between ribs 56.

Foot member 16 has a width $w_1$ which is substantially equal to the width w of plate 12, preferably about 7.25 inches for use with a two-by-eight or 11.25 inches for use with a two-by-twelve. The internal distance i between upstanding members 52 and 54 is preferably slightly less than the thickness t of the beam 14. In a preferred embodiment wherein beam 14 is a two-by-eight or similar piece of lumber, this distance i is preferably approximately 1.5 inches. In one form of the invention, the overall height h of members 52 and 54 is sufficient to retain beam 14 securely therebetween by interference press fit, and preferably height h is generally between 2 to around 3 inches.

In order to provide increased traction along upper surface 14c of angled beam 14, one or more traction plates 18 may be attached to beam 14 intermediate foot 16 and plate 12. The plates 18 can be selectively located at desired intervals depending upon the intended application. A preferred embodiment of a traction plate 18 according to the present invention is shown in FIGS. 7 and 8. Plate 18 preferably is made of a rigid metal plate, preferably 18 gauge steel, which is substantially rectangular in shape and slightly narrower in width than the width of beam 14. In this preferred embodiment, traction plate 18 has a length $L_t$ of approximately 12 inches and a width $W_t$ of approximately 9.75 inches. Traction plate 18 further has formed therein a series of holes 60 to facilitate fastening to beam 14 such as by bolts, nails or any other suitable means known to those having skill in the art.

To increase friction across plate 18 in order to provide traction, plate 18 includes a plurality of punched holes 62 disposed in a regular or random array, preferably having centers spaced about 0.625 inches apart. Holes 62 are preferably punched so as to leave extruded or upstanding flange portions 64 of around 0.3125 inches in diameter $d_1$. The uppermost edges 64a of each upstanding portion 64 tapers to a small thickness of around 0.03 inches and thereby helps break through snow, ice or mud. However, edges 64a define a continuous circular shape and are preferably configured so as to provide a surface taper, whereby sharp points, which could otherwise cut tires or shoes, are avoided.

Upstanding portions 64 in the embodiment illustrated in FIG. 8 extend outwardly from a top surface of plate 18 at a radius r of around 0.4 inches. Holes 62 are preferably positioned in regularly spaced but offset rows as shown in FIG. 7. In one form of the invention, portions 64 extend above a lower surface 18a of plate 18 approximately 0.2 inches and thereby significantly increase friction in order to provide traction for wheels or shoes along inclined beam surface 14a. The diameter $d_2$ of the punched holes 62 at the lower surface is approximately 0.5 inches. This configuration is believed advantageous for dissipating snow and ice in that a sufficient volume is provided whereby snow or ice particles can be received interiorly and exteriorly to upstanding portions 64, with edges 64a protruding therepast to provide a traction surface.

The ramp 10 of the present invention therefore provides an improved ramp which is portable, lightweight and suitable for use in a variety of applications. Ramp 10 may be sold in kit form wherein a prefabricated plate 12, foot 16 and traction plate 18 may be provided along with suitable fastening means and the purchaser/user would provide his or her own piece of standard sized lumber and build the ramp. Variations to the dimensions of the various components of the ramp could be made in order to provide for ramps of different sizes and angle of incline.

The foregoing discussion discloses and describes merely exemplary embodiments of the present invention. One skilled in the art will readily recognize from such discussion, and from the accompanying drawings and claims, that various changes and modifications can be made therein without departing from the spirit and scope of the invention as defined in the following claims.

We claim:

1. A ramp for providing a bridge between a ground level surface and a raised surface, said ramp adapted to facilitate the movement of items from said ground level to said raised surface, said ramp comprising in combination:

an inclined beam member adapted to be disposed at a generally predetermined angle between said ground level and raised surfaces;

a rigid support plate removably attachable underneath a first end of said beam member, said support plate comprising a rectangular sheet formed to include a substantially horizontal first portion adapted to rest upon said raised surface, a second portion extending downwardly from said first portion and a third portion extending from said second portion away from said first portion at said generally predetermined angle, said third portion of said plate supporting said first end of said inclined beam member;

means for removably attaching said beam member to said third portion of said support plate;

a resilient foot member removably engaging a second end of said beam member and adapted to support said second end of said inclined beam member on the ground level surface, said foot member including a generally solid portion having a substantially triangular cross section and disposed adjacent a pair of generally parallel upstanding members, said upstanding members each extending at a substantially right angle from an end section of said triangular portion, said beam member disposed with respect to said foot member so as to abut said end section of said triangular portion between said upstanding members;

said foot member constructed of an elastomeric material for providing a cushioning effect with the ground level surface and with said upstanding members being resiliently movable towards and away from each other; and a plurality of traction plates, each of said traction plates having a plurality of upwardly protruding projections, said plates being secured to a top surface of said beam member intermediate said support plate and said foot member and generally over the length of said beam member to provide a traction surface for persons and/or objects thereon, said upwardly protruding projections comprising a series of extruded flanges upstanding from punched holes, Said flanges having an upper edge defined by a continuous annular surface with said upper edge having a preselected thickness whereby sharp cutting points are avoided.

2. The ramp of claim 1 wherein said traction plate is formed of 18 gauge sheet steel and wherein said projections extend approximately 0.2 inches from a bottom surface of said traction plate whereby said extruded flanges facilitate breaking through ice and snow and trapping the ice and snow therebetween and therearound.

3. The ramp of claim 1 wherein said traction plate is a one-piece construction made of stamped sheet steel and is substantially planar except for said projections, securing means located substantially within the perimeter of said traction plate for securing said traction plate to said top surface of said beam member, said extruded flanges each tapering in thickness to an uppermost edge having a thickness of around 0.03 inches whereby sharp, jagged contact surfaces are avoided and said traction surface is substantially free of sharp cutting points or edges.

4. The ramp of claim 1 wherein the centers of said holes are spaced approximately 0.625 inches apart.

5. The ramp of claim 1 wherein said holes are approximately 0.3125 inches in diameter, said extruded flanges each tapering in thickness to an uppermost edge having a thickness of around 0.03 inches whereby sharp, jagged contact surfaces are avoided and said traction surface is substantially free of third cutting points or edges.

6. The ramp of claim 1 wherein said foot member has one surface of each of said upstanding members and two surfaces of said triangular portion each including a plurality of integrally formed outwardly protruding ribs, a first of said upstanding members having a first body portion adapted to be located on the upper surface of the beam member and a second of said upstanding members having a second body portion adapted to be located at the bottom surface of the beam member, said ribs on said upstanding members protruding from said first and second body portions, the combined thickness of said first body portion and associated ones of said ribs being approximately 60% of the combined thickness of said second body portion and associated ones of said ribs.

7. The ramp of claim 6 wherein said ribs are substantially rectangular in cross section and extend along the width of said foot member.

8. The ramp of claim 1 wherein said support plate is a one-piece construction made of stamped sheet steel.

9. The ramp of claim 1 wherein said support plate is a one-piece construction defined by said first, second and third portions and made of stamped sheet metal, said ramp further comprises a resilient mat disposed substantially on a lower surface of said support plate, said mat being adapted to increase friction and provide stability between said support plate and said raised surface.

10. The ramp of claim 9 wherein said mat is made of rubber.

11. A ramp for providing a bridge between a ground level surface and a raised surface, said ramp adapted to facilitate the movement of items from said ground level to said raised surface, said ramp comprising in combination:

an inclined beam adapted to be disposed at a generally predetermined angle between said ground level and raised surface and having a first end and an opposite second end;

a support plate formed to include three generally planar main portions, a first portion adapted to be removably attached atop a portion of said raised surface, a second portion extending downwardly from said first portion at a substantially right angle, a third portion extending outwardly from said second portion in said generally predetermined angle toward said ground level surface;

fastening means for removably securing said first end of said beam member to said third portion of said support plate;

a resilient, flexible foot member removably mounted on to said second end of said beam member and adapted to support said second end of said inclined beam member on the ground level surface, said foot member constructed of an elastomeric material and including a generally solid portion having a substantially triangular cross section and disposed adjacent a pair of generally parallel upstanding members, said upstanding members each extending at a substantially right angle from an end section of said triangular portion, said beam member disposed with respect to said foot member so as to abut said end section of said triangular portion between said upstanding members, said parallel upstanding members being of a resilient construction and being resiliently movable towards and away from each other to facilitate receiving said second end of said beam member with an interference fit, one surface of each of said upstanding members and two surfaces of said triangular portion of said foot member each including a plurality of outwardly protruding ribs, said ribs being substantially rectangular in cross section and extending along the width of said foot member; and a plurality of traction plates fixedly secured to an upper surface of said beam member intermediate said support plate and said foot member and generally over the length of said upper surface, each said traction plate having a plurality of upwardly protruding projections comprising a series of extruded flanges upstanding from punched holes for providing a slip resistant traction surface for persons or objects thereon, each said traction plate being of a one-piece construction made of stamped sheet steel and being substantially planar except for said projections, securing means located substantially within the perimeter of said traction plate for securing said traction plate to said top surface of said beam member.

12. The ramp of claim 11 wherein said foot member is made of an elastomeric material having a durometer of around 70 shore A to provide a cushioning effect with the ground level surface, said support plate being a metal stamping and said beam being made of a non-metallic material.

13. The ramp of claim 11 wherein said extruded flanges each taper in thickness to an uppermost edge defining a continuous annular surface having a thickness of around 0.03 inches whereby said traction surface is substantially free of sharp cutting points or edges.

14. The ramp of claim 13 wherein said traction plate is formed of 18 gauge sheet metal and said projections extend approximately 0.2 inches from a bottom surface of said traction plate to facilitate breaking through ice and snow and mud which may be located on said traction plate.

15. The ramp of claim 14 wherein the centers of said holes are spaced approximately 0.625 inches apart and said holes are approximately 0.3125 inches in diameter.

16. In a portable ramp for providing a bridge between a lower surface and a raised surface, said ramp adapted to facilitate the movement of items from the lower surface to the raised surface, said ramp including an inclined beam member adapted to be disposed at a generally predetermined angle between the lower surface and the raised surface, and having an upper end adapted to be supported on the raised surface and a lower end adapted to be supported on the lower surface, the improvement comprising:

a resilient foot member removably engagable with said lower end of said beam member and adapted to support said lower end of said inclined beam member on the lower surface, said foot member being constructed of an elastomeric material and comprising:

a generally solid portion, said solid portion being substantially triangular in cross section;

a pair of generally parallel upstanding members, said upstanding members each extending at a substantially right angle from an end section of said triangular portion, said foot member being disposed with respect to said beam member so that said lower end of said beam member abuts said end section of said triangular portion between said upstanding members, said foot member as constructed of the elastomeric material providing a cushioning effect with the lower surface, said upstanding members being spaced a distance relative to the thickness of said beam member at said lower end whereby said foot member can be generally secured to said beam member with said lower end of said beam member being engagable with said end section, said parallel upstanding members being of a resilient construction and with said upstanding members being resiliently movable towards and away from each other to facilitate receiving said lower end of said beam member with an interference fit.

17. The foot member of claim 16 wherein one surface of at least one of said upstanding members and two surfaces of said triangular portion of said foot member each include a plurality of outwardly protruding ribs, said ribs extending generally along the width of said foot member.

18. The portable ramp of claim 16 wherein said foot member is made of an elastomeric material having a durometer of around 70 shore A whereby the cushioning effect with the ground level surface is provided.

19. In a portable ramp for providing a bridge between a lower surface and a raised surface, said ramp adapted to facilitate the movement of items from said lower surface to said raised surface, said ramp including an inclined beam member disposed at a generally predetermined angle between said lower and raised surfaces, said beam member being constructed of a non-metallic material, and having an upper end adapted to be supported on said raised surface and a lower end adapted to be supported on said lower surface, the improvement comprising a plurality of traction plates, said traction plates adapted to be secured to an upper surface of said beam member generally over the length of said upper surface intermediate said upper and lower ends, each said traction plate having formed therein a series of outwardly protruding projections defining a series of annular, tapered flanges upstanding from punched holes for defining a slip resistant traction surface, said traction plate being a one-piece construction made of stamped sheet steel and being substantially planar except for said projections, said tapered flanges each tapering in thickness to an outermost edge having a thickness of around 0.03 inches whereby sharp, jagged contact surfaces are avoided and whereby said traction surface is substantially free of shard cutting points or edges, securing means located substantially within the perimeter of said traction plate for securing said traction plate to said top surface of said beam member, an elastomeric foot member adapted to engage said lower end of said beam for supporting said beam on said lower surface.

20. The traction plate of claim 19 wherein the centers of said holes are spaced approximately 0.625 inches apart and said holes are approximately 0.3125 inches in diameter.

21. The portable ramp of claim 19 wherein said traction plate is formed of 18 gauge sheet metal and said projections extend approximately 0.2 inches from a bottom surface of said traction plate to facilitate breaking through ice and snow and mud which may be located on said traction plate.

22. In a fabricated member for providing a bridge between an upper location and a lower location and having an upper end and a lower end and an upper surface for supporting persons for walking with the member being made of a non-metallic material, the improvement comprising a plurality of traction plates, said traction plates adapted to be secured to the upper surface of the fabricated member generally over its length, each said traction plate having formed therein a series of outwardly protruding projections defining a series of annular, tapered flanges upstanding from punched holes for defining a slip resistant traction surface, said extruded flanges each tapering in thickness to an outermost edge and being defined by a generally annular continuous surface having a thickness of around 0.03 inches whereby sharp, jagged contact surfaces are avoided and whereby said traction surface is substantially free of sharp cutting points or edges, said traction plate being a one-piece construction made of stamped sheet steel and being substantially planar except for said projections, securing means located substantially within the perimeter of said traction plate for securing said traction plate to said upper surface of the fabricated member, and an elastomeric foot member added to engage said lower end of said fabricated member for supporting said lower end of said fabricated member at the lower location.

23. The ramp of claim 22 wherein said traction plate is formed of 18 gauge sheet metal and said projections extend approximately 0.2 inches from a bottom surface of said traction plate to facilitate breaking through ice and snow and mud which may be located on said traction plate.

24. The traction plate of claim 23 wherein the centers of said holes are spaced approximately 0.625 inches apart and said holes are approximately 0.3125 inches in diameter.

\* \* \* \* \*

UNITED STATES PATENT AND TRADEMARK OFFICE
CERTIFICATE OF CORRECTION

PATENT NO. : 5,608,937
DATED : March 11, 1997
INVENTOR(S) : R. Seigneur & R. Frankel It is certified that error appears in the above-indentified patent and that said Letters Patent is hereby corrected as shown below:

Col. 2, line 45, after "Ramp" insert --10--.

Col. 4, line 2, delete "12" and insert therefor --$1_2$--.

Col. 7, line 10, Claim 5, delete "third" and insert --sharp--.

Col. 9, line 45, Claim 19, delete "shard" and insert --sharp--.

Col. 10, line 35, claim 22, delete "added" and insert --adapted--.

Signed and Sealed this

Tenth Day of June, 1997

Attest:

BRUCE LEHMAN

Attesting Officer

Commissioner of Patents and Trademarks